Jan. 5, 1926.

G. E. BISHOP

POCKET IN AUTOMOBILE TOPS

Filed Oct. 12, 1923

1,568,712

INVENTOR
George E. Bishop
BY George W. Saywell
ATTORNEY

Patented Jan. 5, 1926.

1,568,712

UNITED STATES PATENT OFFICE.

GEORGE E. BISHOP, OF CLEVELAND, OHIO.

POCKET IN AUTOMOBILE TOPS.

Application filed October 12, 1923. Serial No. 668,208.

*To all whom it may concern:*

Be it known that I, GEORGE E. BISHOP, a citizen of the United States, resident of Cleveland, county of Cuyahoga, and State of Ohio, have invented new and useful Improvements in Pockets in Automobile Tops, of which the following is a specification, the principle of the invention being herein explained and the best mode in which I have contemplated applying that principle, so as to distinguish it from other inventions.

My invention relates to new and improved automobile pockets and particularly to constructions of this character formed adjacent the deck of the automobile top. Particularly, the invention relates to a pocket adapted to carry in storage condition removable door curtains and other removable body side enclosures, although the invention is not limited to such use. The invention also includes improvements for reinforcing the rear of the top.

The annexed drawing and the following description set forth in detail certain means illustrating my invention, such disclosed means constituting, however, but a few of the various forms in which the principle of the invention may be embodied.

Figure 5:
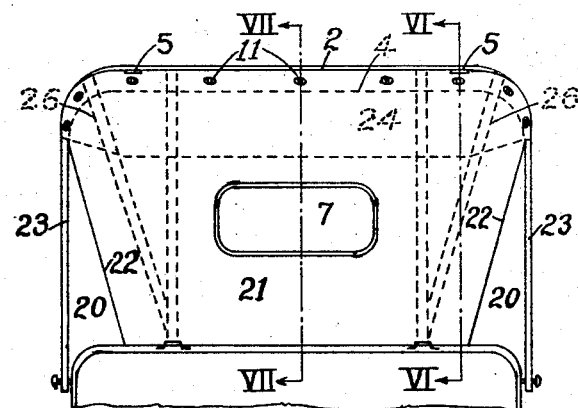

Figure 5 represents an elevation from the inside of an automobile formed with a standard rear top construction and having certain elements of this construction reorganized and reinforced to form, with a minimum of expense and inconvenience, one of my improved pockets adjacent the rear of such standard top; also showing an improvement whereby the rear of the top and particularly the glass outlook provided therein are restrained from flapping.

Figures 6, 7:
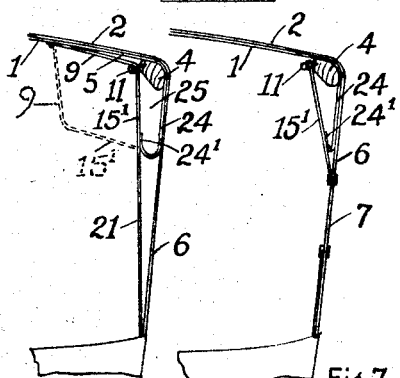

Figure 6 represents a fragmentary, vertical, longitudinal section through the rear of the standard automobile top illustrated by Figure 5 and taken in the plane indicated by the line VI—VI, Figure 5, the full lines showing the closed position and the dotted lines the open position of the pocket; and Figure 7 represents a fragmentary, vertical, longitudinal section taken in the plane indicated by the line VII—VII, Figure 5;

Referring to the annexed drawing in which the several elements are indicated in the different views by the same respective ordinals, I indicate the deck of an automobile top by the ordinal 1, the same having the outer fabric cover 2, the intermediate transverse bow 3, the upper rear transverse bow 4, the longitudinal webbing strips 5; as also the rear 6 of the top having the usual glass outlook 7. The blank which I apply to this deck 1, to form the improved pocket in the rear of the vehicle, is indicated by the ordinal 8, Figure 1, and one edge of the same is cut back to a point indicated by the ordinal 12, so as to remove a rectangular section of the blank and thus form the end straps 9 extending from the ends of the border 12. The blank 8 is also formed with a series of button eyelets 10 located in a plane adjacent the plane of the border 12. The straps 9 are fastened at their outer ends to the deck 1 and preferably to the webbing 5, as plainly shown in Figure 2, and the fastener eyelets 10 are adapted to cooperate with button studs 11 secured to the deck 1 and preferably extended forwardly from the rear bow 4. A section 15 of the blank 8 is secured to the deck-rear 6 and the edge 12' of the blank material 8, which is opposite to the edge indicated by the straps 9 is secured in any suitable manner to the deck 1 and preferably to the rear edge of the top rear bow 4. A section 15' of the blank extends from the section 15 to the fastener elements 10 and 11. The size of the blank material 8 is such as to form a substantially triangular pocket, when closed, of the character indicated by the ordinal 13, Figure 2. It will be noted that this pocket is filled with a packet 14, which probably, in the most practicable use of the pocket, would be a suitably folded removable door curtain or other removable top side enclosure. This packet 14 is inserted into the pocket 13 between the supporting straps when the pocket is in the open position illustrated by the dotted line, Figure 2. It will be evident that in this open position of the pocket the section 15' of the blank material 8 forms an adequately supported and fairly level platform upon which the filler may be conveniently laid preliminary to the forcing of the supporting straps 9 and the platform 15' with its filler load upwardly and rearwardly so as to fasten the pocket in its closed position through the medium of the eyelets 10 and the fastener studs 11.

Figure 4:
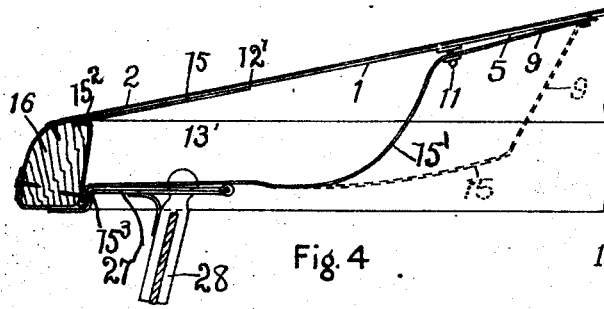
Figure 4 represents, upon an enlarged scale, a fragmentary, vertical, longitudinal section of the windshield and forward deck of an automobile top, illustrating the application of the improved pocket shown in Figure 3.
Figure 3:
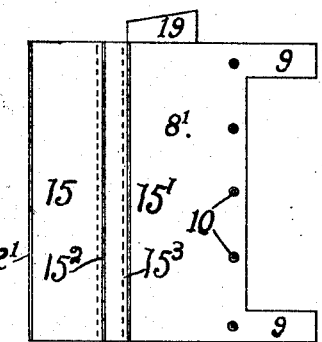
Figure 3 represents a view of another form of blank material adapted, when properly folded and coordinated with various standard automobile top elements, to form a pocket, of the character described, adjacently above the automobile windshield.
Figure 2:
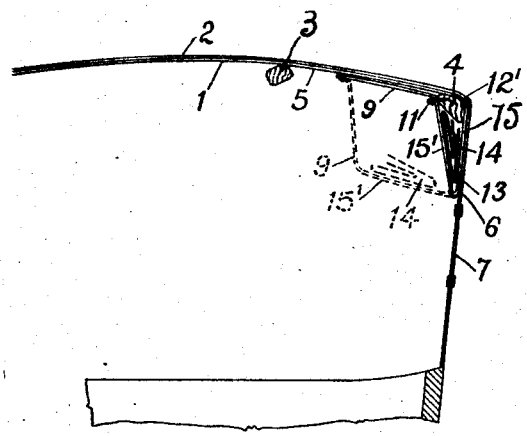
Figure 2 represents a fragmentary, vertical, longitudinal section of the deck and rear of an automobile top showing in full lines the closed condition of this improved pocket, the door curtain or other filler being suitably folded and stored therein, the open position of the pocket immediately after having received the filler being indicated by dotted lines.
Figure 1:
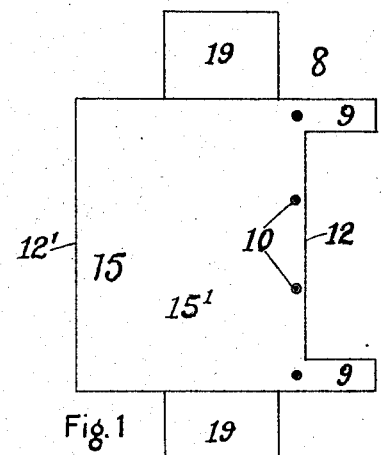
Figure 1 represents a plan view of one form of blank material adapted, when folded as hereinafter explained and when coordinated with various standard top elements, to form my improved pocket.

The application of the principle, hereinbefore described with reference to the rear of a top deck in Figures 1 and 2, is shown in Figures 3 and 4 with reference to the formation of a pocket of this character adjacent the front of the top deck. In this application the edge 12' of the blank material 8', Figure 3, is secured to the deck 1, as shown in Figure 4, and fastener studs 11 are also secured to the deck 1, and the blank 8', when closed, forms in cooperation with the front bow 16 and the deck 1 a pocket of the character indicated by the ordinal 13', Figure 4. In this application of the pocket I prefer to fasten the same in doubled form, as illustrated by section 15², between the deck 1 and the front bow 16 and also to secure the same in doubled condition, as illustrated by the section 15³, to the bottom of the inner face of the bow 16 and between said bow 16 and the member 27 which forms the standard top closure for the windshield 28. The member 27 also forms a support over the windshield for the pocket member 8' and its contained curtain or other filler. In both the forms of said blank shown in Figures 1 and 3, I have indicated side tabs 19. The provision of these tabs 19 is optional and would probably be found of convenience upon occasions for the purpose of closing the open ends of the pockets 13 and 13'.

In one form of my invention, the improvement is particularly coordinated with one of the standard forms of the rear sections of automobile tops. In this standard form, there is provided, in addition to the extreme rear section 6 which is carried forwardly to the supporting bows 23 so as to form the "gipsies" 20 at the rear side portions, an additional inner liner section 21 which extends at the sides substantially only to the lines indicated by the ordinal 22 and ordinarily is fastened to the rear of the rear bow 4 inside of the extreme rear top section 6. My reorganization of this standard rear construction to form my improved pocket and to strengthen the rear of the top so as to prevent the glass outlook 7 from flapping consists in separating this inner rear section 21 from the extreme rear curtain 6 so as to form a pocket 25 of V-cross section. As plainly shown in Figure 6, this separation of the sections 6 and 21 is complete from bottom to top laterally of the glass outlook 7, and in the planes of said glass outlook 7, Figure 7, the separation is effected only above the outlook 7. The pocket proper in either event is of similar cross-section in all planes because of the provision of the additional rear strengthening member 24 which is secured at the top to the rear of the bow 4 and extends downwardly inside the section 6 to a point adjacent the outlook 7 where it is secured by an angular end section 24' to the member 15', as plainly shown in Figures 6 and 7. The inner liner 21 which is thus opened up to form the V-shaped pocket 25 is provided with supporting straps 9, and fastener elements 10 and 11, similar to those shown in Figure 2, whereby the pocket formed by this reorganization of the inner liner of the standard construction can be opened into the dotted position shown in Figure 6 to provide the supported platform 15'. The inner liner 21 is preferably attached to the frame of the glass outlook 7 around the entire periphery of said frame, and it is evident that this attachment, in combination with the V-shaped pocket 25, will provide a reinforcement for the outlook frame which will prevent the latter from flapping.

I do not limit myself to the provision of the pocket 13 transversely of the deck 1 or to the reinforcing of an outlook upon the rear of the top, inasmuch as said pocket 13 can be provided longitudinally of the deck 1 and the reinforcement may be provided for a side outlook.

I have indicated by the ordinal 26 the usual stay straps of an automobile top construction.

What I claim is:

1. The combination with an automobile top deck; of a flexible member secured adjacent opposite edges under and to said deck, the points of attachment being spaced apart a distance less than the distance between said edges, so as to provide a pocket between the deck and said member, the latter being also detachably secured intermediate said edges to the deck, whereby the pocket can be opened and closed and a supported platform is provided to receive and hold the filler when the pocket is open.

2. The combination with an automobile top deck including longitudinal webbing and a transverse bow; of a flexible member secured adjacent one edge to said webbing and adjacent the opposite edge to said bow, the points of attachment being spaced apart a distance less than the distance between said edges, so as to provide a pocket between the deck and said member, the latter being also detachably secured intermediate said edges to the deck, whereby the pocket can be opened and closed and a supported platform is provided to receive and hold the filler when the pocket is open.

3. The combination with an automobile top deck including longitudinal webbing and a transverse bow; of a flexible member secured adjacent the ends of one edge to said webbing and adjacent the opposite edge to said bow, the points of attachment being spaced apart a distance less than the distance between said edges, so as to provide a pocket between the deck and said member, the latter being transversely detachably secured intermediate said edges to the deck, whereby the pocket can be opened and closed and a supported platform is provided upon the bow side to receive and hold the filler when the pocket is open, the material of said member being cut away intermediate said last-mentioned connection and the webbing connection to form a filler-receiving opening.

4. The combination with an automobile top deck including longitudinal webbing and a transverse bow; of a flexible member secured adjacent the ends of one edge to said webbing and adjacent the opposite edge to the rear of said bow, the points of attachment being spaced apart a distance less than the distance between said edges, so as to provide a pocket between the deck and said member, the latter being transversely detachably secured intermediate said edges to the front of said bow, whereby the pocket can be opened and closed and a supported platform is provided adjacent the bow to receive and hold the filler when the pocket is open, the material of said member being cut away intermediate said last-mentioned connection and the webbing connection to form a filler-receiving opening.

5. The combination with an automobile top including a deck having a transverse rear bow; of a flexible member secured adjacent the ends of one edge to said deck and adjacent the opposite edge to the rear of said bow, a portion of said member of material width adjacent said last-named edge being secured to the rear of the top, so as to provide a pocket between the deck, the bow and the rear of the top, said member being also transversely detachably secured, intermediate said top rear portion and the deck connection, to the front of said bow, whereby the pocket can be opened and closed and a supported platform is provided upon the bow side to receive and hold the filler when the pocket is open, the material of said member being cut away intermediate said last-mentioned connection and the deck connection to form a filler-receiving opening.

6. The combination with an automobile top including a deck, and a vertical enclosure provided with an outlook; of a flexible member secured adjacent opposite edges under and to said deck, the points of attachment being spaced apart a distance less than the distance between said edges, so as to provide a pocket between the deck and said member, the latter being also detachably secured intermediate said edges to the deck, whereby the pocket can be opened and closed and a supported platform is provided to receive and hold the filler when the pocket is open, a portion of said member being extended downwardly and secured adjacent the outlook to form in conjunction with the vertical enclosure a V-shaped strengthening member for the outlook.

7. The combination with an automobile top including a deck provided with longitudinal webbing and a transverse bow, and a rear enclosure provided with an outlook; of a member secured adjacent one edge to said webbing and adjacent the opposite edge to said bow, the points of attachment being spaced apart a distance less than the distance between said edges, so as to provide a pocket between the deck and said member, the latter being also detachably secured intermediate said edges to the deck, whereby the pocket can be opened and closed and a supported platform is provided to receive and hold the filler when the pocket is open, a portion of said member being extended downwardly and secured to the outlook to strengthen the setting of the latter.

8. The combination with an automobile top including a deck provided with longitudinal webbing and a transverse bow, and a rear enclosure provided with an outlook; of a member secured adjacent one edge to said webbing and adjacent the opposite edge to said bow, the points of attachment being spaced apart a distance less than the distance between said edges, so as to provide a pocket between the deck and said member, the latter being also detachably secured intermediate said edges to the deck, whereby the pocket can be opened and closed and a supported platform is provided to receive and hold the filler when the pocket is open, a portion of said member being secured to the rear enclosure, and a portion secured to the platform portion and extended downwardly and secured to the rear enclosure adjacent to the outlook to strengthen the setting of the latter.

Signed by me this 5th day of October, 1923.

GEORGE E. BISHOP.